United States Patent [19]
Markson

[11] 3,817,396
[45] June 18, 1974

[54] PORTABLE DISPLAY APPARATUS
[75] Inventor: David E. Markson, Chicago, Ill.
[73] Assignee: Package Exhibit Programs, Inc., Lincolnwood, Ill.
[22] Filed: June 9, 1972
[21] Appl. No.: 261,520

[52] U.S. Cl.......... 211/178 R, 40/125 H, 40/130 R, 160/135
[51] Int. Cl. ............................................. A47f 5/10
[58] Field of Search........ 211/178 R, 177, 182, 148; 52/282, 36, 239, 228; 40/125 H, 65, 130 R; 160/183, 135; 312/257 R, 263; 287/20.92 D, 20.92 Y, 189.36 H, 189.36 R

[56] References Cited
UNITED STATES PATENTS

| | | | |
|---|---|---|---|
| 2,677,420 | 5/1954 | Kuyper | 160/183 |
| 2,975,092 | 3/1961 | Hagerty | 287/20.92 D X |
| 3,232,333 | 2/1966 | Dixon | 160/183 |
| 3,319,801 | 5/1967 | Nordstrom | 211/178 R |
| 3,329,282 | 7/1967 | Swan et al. | 211/177 |
| 3,519,235 | 7/1970 | Walter | 211/178 R X |
| 3,559,814 | 2/1971 | Downing | 211/178 R X |
| 3,684,103 | 8/1972 | Bellinder | 211/177 |
| 3,685,666 | 8/1972 | Rose | 211/178 R |

FOREIGN PATENTS OR APPLICATIONS
1,042,110   10/1953   France..................... 287/20.92 D Primary Examiner—Ramon S. Britts
Attorney, Agent, or Firm—Johnson, Dienner, Emrich, Verbeck & Wagner

[57] ABSTRACT

A portable display apparatus which is designed to be easy to assemble and disassemble and to have a light weight construction comprises a plurality of display units joined together in a side-by-side relation. Each of the display units is identical in construction comprising a pair of skeletal frames made of metal tubing and hinged together along one common side so that one of the frames can be swung above the other. Each of these skeletal frames includes a pair of inwardly facing track means provided on the opposite upstanding sides in order to slidably mount a pair of light weight insert panels. When the display units are bolted together they provide a unitary display structure and include means for mounting shelves, lighting fixtures, and the like. A support unit is fastened to each end of the unitary display structure to hold it up in an upstanding position.

5 Claims, 11 Drawing Figures

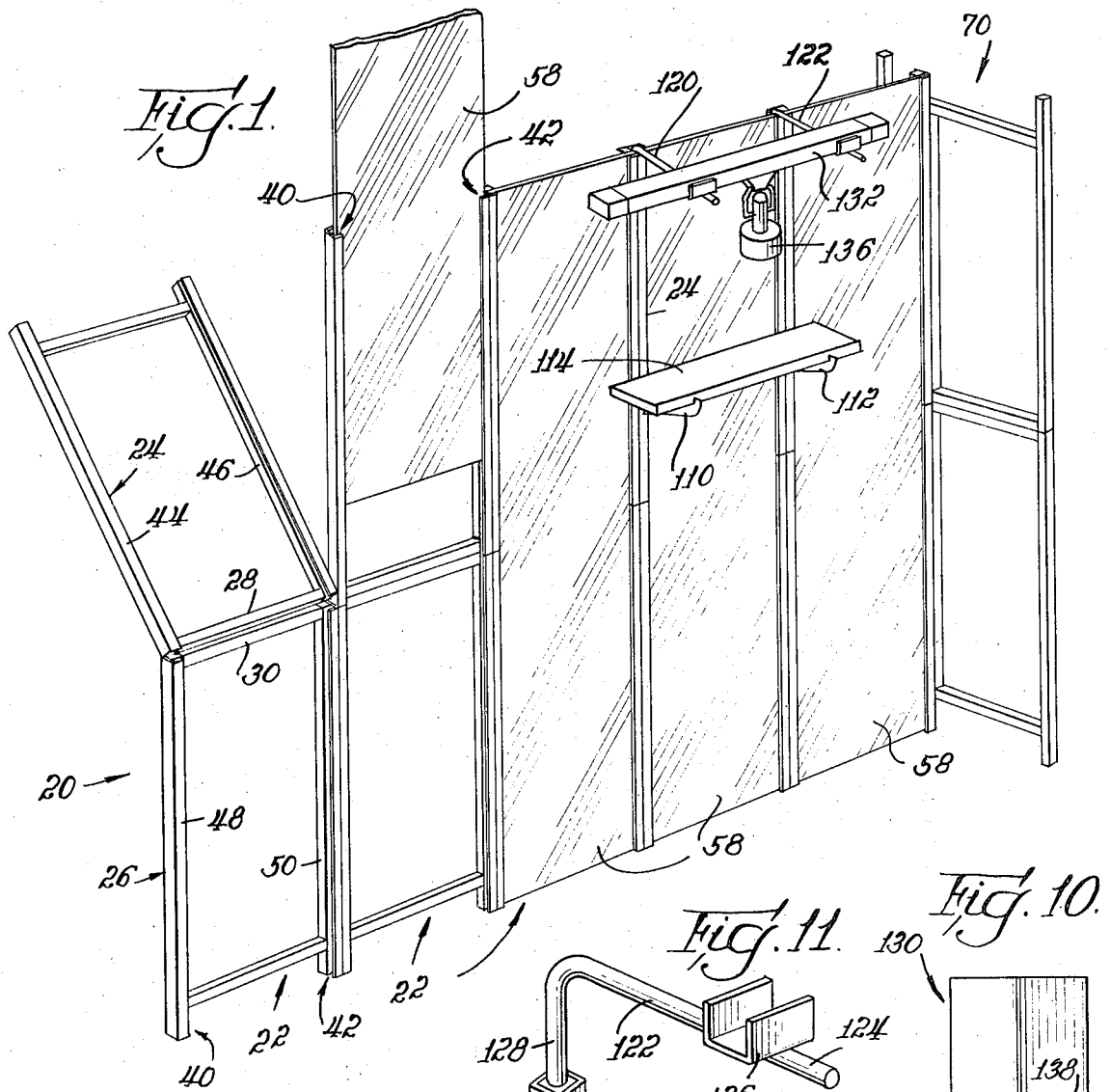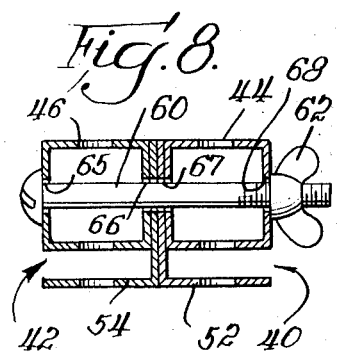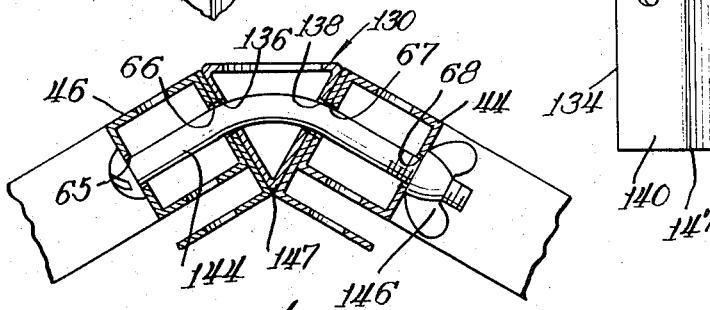

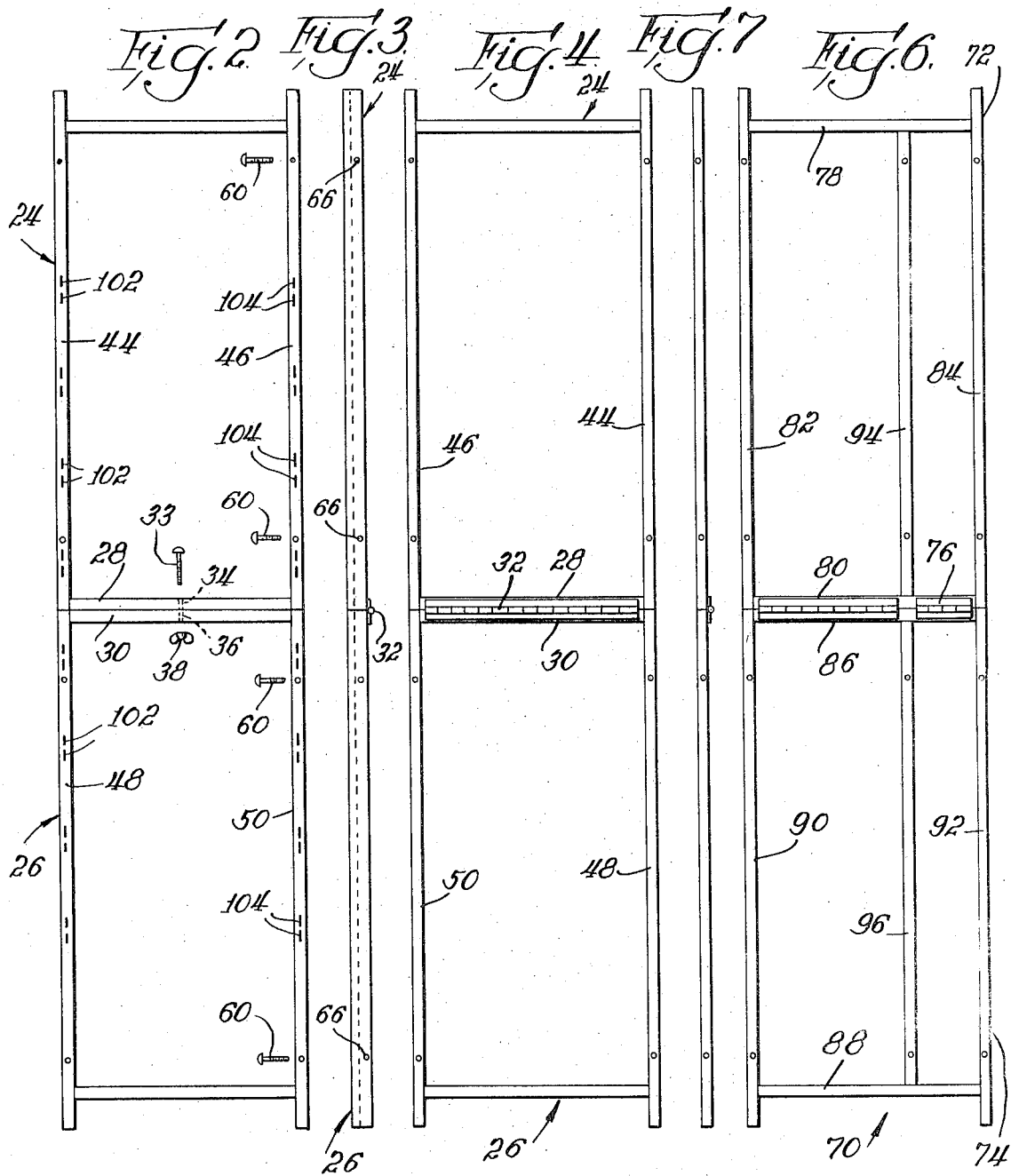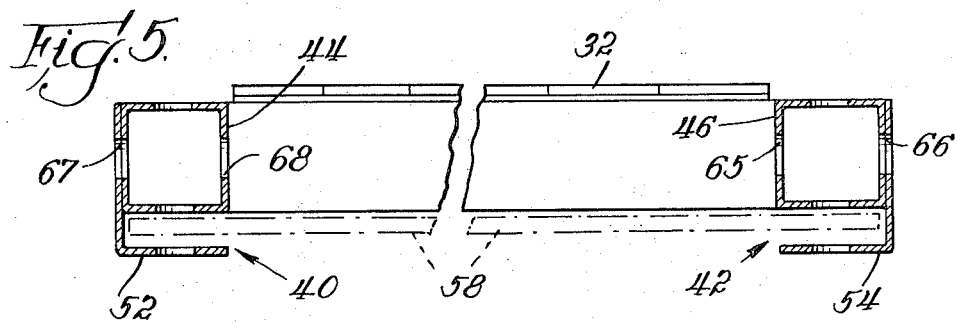

PORTABLE DISPLAY APPARATUS

BACKGROUND OF THE INVENTION

This invention relates to a portable display apparatus which can be quickly assembled or disassembled, and which is made of a light weight construction.

Because of the relatively high cost of shipping large items and the large labor costs required for setting up elaborate display booths at a trade show or the like, there is a need for a display apparatus which can be shipped in relatively small freight cartons, will have a light weight construction, and can be quickly assembled or disassembled. This invention satisfies all of these needs for it has a very light weight construction, can be quickly assembled or disassembled, and can be packed into small shipping cartons, or could even be carried in an automobile.

Another advantage of this invention is that its design provides an infinite variety of both types and sizes of displays.

SUMMARY OF THE INVENTION

Portable display apparatus is assembled from a plurality of individual display units which are joined together in a side-by-side relation. Each of these display units is made up of a pair of skeletal frames connected together along one common side by a hinge and arranged with one of the frames swung above the other. Each of the skeletal frames has a pair of inwardly facing track means extending along opposite upstanding sides of the two skeletal frames in which light weight panels are slidably inserted. The display units when fastened together in a side-by-side relation provide a unitary display structure which is supported in an upstanding position by a pair of support units fastened to the ends of the two outermost display units. Hanger means are provided on the unitary display structure for mounting display shelves adjacent to but not attached to the lightweight insert panels and lighting fixtures are provided for the lights.

DESCRIPTION OF DRAWINGS

For a better understanding of this invention, reference may be made to the accompanying drawings in which:

FIG. 1 is a front perspective view of the apparatus embodying the principles of my invention;

FIG. 2 is an elevational front view of one of the display units shown in FIG. 1;

FIGS. 3 and 4 are, respectively, side and rear views of the display unit illustrated in FIG. 2;

FIG. 5 is a cross sectional view of the display unit of FIG. 2;

FIGS. 6 and 7 are, respectively, elevational side and rear views of the support unit mounted at the right end of the display apparatus of FIG. 1;

FIG. 8 is a cross sectional view of the abutting sides of two of the display units illustrated in FIG. 1 depicting the fastening means for clamping the two display units together;

FIG. 9 is a cross sectional view similar to FIG. 8 illustrating a modification of my invention in which a triangular spacer means is used to vary the design configuration of the display apparatus;

FIG. 10 is a front elevational view of one of the triangular shaped spacer means illustrated in FIG. 9;

FIG. 11 is a front perspective view illustrating a pivotal bracket used in mounting the lighting fixture depicted in FIG. 1.

DESCRIPTION OF PREFERRED EMBODIMENT

Referring to FIG. 1 there is shown a front perspective view of a portable display apparatus which embodies the principles of my invention and is generally designated by the reference numeral 20.

Display apparatus 20 is made up of a plurality of display units 22 which are fastened together in a side-by-side relation. Each of the display units 22 have an identical construction comprising a pair of skeletal frames 24 and 26 of a generally rectangular shape which are hingedly connected together along adjacent horizontal sides 28 and 30, respectively. The skeletal frames are preferably made of square tubing from a light weight material such as aluminum to provide a very light weight but rigid construction.

As shown in FIG. 4, a hinge 32 is fastened to the back side of the adjacent horizontal sides 28 and 30 such that frame 24 is adapted to swing upwardly to a position directly above frame 26 to provide a tall structure equal to two times the height of either frames 24 or 26. To hold the two frames in a straight end-to-end relation, a bolt 33 (FIG. 2) may be inserted through aligned openings 34 and 36 provided crosswise through the sides of the frame legs 28 and 30. Once in place, a wing nut 38 may be added to prevent accidental disassembly.

Upper and lower frames 24 and 26 of each frame unit 22 are provided with inwardly facing track means 40 and 42, respectively, supported by the upstanding tubular legs 44 and 46 of the upper frame 24 and 48 and 50 of the lower frame 26. Track means 40 and 42 comprise L-shaped element 52 and 54 (FIG. 5), respectively, which extend substantially the entire length of the pair of frames 24 and 26. A light weight insert panel 58 is inserted between the track means 40 and 42, as depicted in FIG. 5 to fill the open area contained within each frame 24 and 26. This light weight panel 58, which for example could be made up of a thin sheet of foam-core material, can be coated with any desired color to present a background for a display booth, or alternatively could be part of an advertisement message.

The display units 22 are fastened together in a side-by-side relationship by means of a plurality of locking bolts threaded through aligned openings in abutting vertical legs 44, 48 and 50 of adjacent display units to provide a unitary display structure 20. As illustrated in FIG. 2, two sets of wing nuts and bolts 60, 62 are provided for interconnecting the adjacent upper and lower units. Obviously, a greater or lesser number of such sets could be used as desired. The length of the bolts 60 used for this purpose must be of sufficient length to extend through two times the thickness of the metal tubing as shown in FIG. 8.

To support the display apparatus 20 in an upright position, a support unit 70 is fastened to both outermost ends of the unitary display structure 20 in a crosswise arrangement to the length of the unitary display structure. Referring to FIGS. 6 and 7, support unit 70 comprises a pair of skeletal frames 72 and 74 hinged together by a hinge 76 in the same manner as the display units 22. The upper skeletal frame 72 has a generally rectangular shape defined by upper and lower tubular sides 78 and 80 innerconnected in a right angle relationship by a pair of upstanding tubular legs 82 and 84. Likewise, the lower frame 74 comprises upper and lower horizontal sides 86 and 88 innerconnected in a right angle relationship to a pair of vertical sides or legs 90 and 92. For the purpose of fastening the support unit 70 to the end display unit 22 a pair of vertical mounting bars 94 and 96 extend between the upper and lower cross bars of upper and lower frames 72 and 74, respectively. Skeletal frames 72 and 74 preferrably has a light weight tubular construction, such as aluminum tubing, which is quite sturdy due to its design.

The mounting bars 94 and 96 are located in the back half portion of the support unit in order to give greater support to the front side of the portable display device, from which various items such as display lights and shelves may be hung as depicted in FIG. 1.

To permit the ready mounting of display shelves at a variety of locations on the display apparatus, each of the display units 22 is provided with several sets of vertical slits 102 and 104 in the front face of the vertical leg members 44, 46, 48 and 50. To mount a shelf at a selected level, all that is necessary is to insert a pair of conventional knife brackets 110 and 112, respectively, in corresponding sets 102 and 104 of slits, and place a rectangular plank 114 across the knife brackets 110 and 112. Since each of the frames 24 and 26 of display units 22 is provided with several sets of these slits, it will be appreciated that quite a large number of shelves can be assembled as desired.

Another feature of this invention is to provide a means for mounting a display light fixture at the upper end of the display apparatus 20. For this purpose, a pair of circular rods 120 and 122 having a 90 degree bend are employed. Referring to FIG. 11, a U-shaped receptacle 126 is secured to the outer end of one leg portion 124 of L-shaped rod 122. The other leg portion 128 having a cross section less than the inside cross section of the tubular legs 44 and 46 is inserted into the upper end of tubing 44 or 46 for pivotal movement. After both of the L-shaped rods 120 122 are in place, the rectangular base for the light fixture 132 is inserted into the pair of U-shaped holders 126 such that the display lamp 136 can be positioned to direct its light beam on shelf 114.

One significant modification which could be made to the above described display apparatus is to use a triangular shaped spacer means 130 between adjacent display units 22 as illustrated in FIG. 9 for the purpose of varying the configuration of unitary display structure 20. This spacer means 130 could comprise a single triangular shaped element of the cross section shown in FIG. 9 extending substantially the entire length of the display units, or alternatively, could comprise the use of two or more triangular shaped pieces 134 as depicted in FIG. 10 which would be located at the several aligned openings provided in the adjacent frame units for clamping purposes. Thus, the triangular piece 134 shown in FIG. 10 has a pair of openings 136 and 138 formed on the same horizontal plane of adjacent surfaces 140 and 142.

To install the triangular pieces 130, they are held in alignment with the openings 65, 66, 67 and 68 as shown in FIG. 9 and a curved bolt 144 is inserted through these aligned aperatures. Finally, wing nut 146 is tightened on the end of the curved bolt 144. By use of these triangular shaped spacer means 130, a variety of configurations can be derived. For example a continuously curved unitary display structure is provided when triangular spacer means 130 is inserted between each adjacent pair of display units. Another possible design is to alternately reverse the direction of the apex 147 of the triangular spacer members to achieve a zig-zag pattern.

Another major advantage of this invention is that the construction of the portable display apparatus 20 is quite flexible to meet a variety of space conditions and other circumstances. For example, the frame units 22 can be arranged and coupled together in a square shaped pattern. Should the display apparatus be set up in such a zig-zag pattern, the lighting fixture 132 can still be used by virtue of the fact that the pair of L-shaped mounting rods are rotatably supported in the upper ends of the frame legs 44 and 46.

From the foregoing description, it will be apparent that the display apparatus 20 when disassembled can be compacted into a very small package which will be relatively light in weight. Another distinctive advantage over prior art display apparatus is that this invention permits the assembly without the need for any hand tools. A further advantage is that the display apparatus can be adapted to fit the needs of the space available for displaying and offers a variety of choices in the particular design of the display apparatus it is distinctive that the thin insert panel 58 are readily removable and would ship adjacent to stacked frame units 22 thereby providing an unobstructed space for packing shelf brackets, shelves and light units.

I claim:

1. A portable display apparatus comprising a plurality of readily detachably connected display units joined together in a side-by-side relation, each of said display units comprising a pair of skeletal generally rectangular frames, each of said frames including two generally vertical members connected together by a pair of rigid generally horizontal members adjacent the ends thereof, a horizontal member of each frame being hingedly fastened together on a horizontal axis along adjacent horizontal sides of said frames and arranged with one of said frames disposed above the other, said hingedly fastened frames being vertically swingable with respect to each other about said horizontal axis, inwardly facing track means provided on each of said vertical members and arranged opposite each other, insert panels slidably received by and between said opposed track means of each display unit, fastening means detachably securing together said vertical members of adjacent display units to provide a unitary display structure, and a support unit fastened in angular relationship to the two ends of said unitary structure for holding the unitary structure for holding the unitary structure in an upstanding position.

2. A display apparatus as defined in claim 1, wherein said support unit comprises another pair of skeletal frames hingedly fastened together along adjacent horizontal sides of said frames disposed above the other, said another pair of skeletal frames fastened at a location intermediate its upstanding sides to the end display unit of said unitary display structure in a crosswise orientation thereto.

3. A portable display apparatus as defined in claim 1, wherein said fastening means includes triangular shaped spacer means disposed between said upstanding sides of adjacent display units to enable said unitary structure to present a zig-zag configuration or curved configuration in a lengthwise direction.

4. A portable display apparatus as defined in claim 1, wherein each of said frame units comprises a set of corresponding slits in said upstanding sides for mounting a pair of knife brackets.

5. A portable display apparatus as defined in claim 1, wherein said pair of skeletal frames are constructed of lightweight square tubing, and further comprising a mounting means for hanging a light fixture including a pair of L-shaped rods of a cross section less than the inside corss section of said square tubing, one leg of said L-shaped rods pivotally supported in the upper open end of said upstanding sides, and a U-shaped receptacle secured to the other leg of said L-shaped rod for supporting a light fixture therebetween.

* * * * *